(12) United States Patent
Voo (10) Patent No.: US 7,848,043 B1
(45) Date of Patent: Dec. 7, 2010

(54) CIRCUITS, SYSTEMS, AND METHODS FOR LOW NOISE BIASING OF MAGNETIC-RESISTANCE SENSORS

(75) Inventor: Thart Fah Voo, Singapore (SG)

(73) Assignee: Marvell International Ltd., Hamilton (BM)

( * ) Notice: Subject to any disclaimer, the term of this patent is extended or adjusted under 35 U.S.C. 154(b) by 612 days.

(21) Appl. No.: 11/893,162

(22) Filed: Aug. 14, 2007

Related U.S. Application Data (60) Provisional application No. 60/822,688, filed on Aug. 17, 2006.

(51) Int. Cl.
G11B 5/03 (2006.01)
(52) U.S. Cl. .............................. 360/66; 360/68; 360/31
(58) Field of Classification Search ........................ None
See application file for complete search history.

(56) References Cited

U.S. PATENT DOCUMENTS 6,538,833 B2 * 3/2003 Choi ........................... 360/46
6,822,817 B2 * 11/2004 Chung et al. .................. 360/46

FOREIGN PATENT DOCUMENTS

JP 61129702 A * 6/1986

* cited by examiner

Primary Examiner—Jason C Olson (57) ABSTRACT

Circuits, systems, and methods for generating bias for a magneto-resistive (MR) sensor in a magnetic storage device. The circuits generally include an amplifier having an input coupled to a magneto-resistive (MR) sensor, a feedback resistive element having an output coupled to the MR sensor, and a feedback control circuit having a first input coupled to an output of the amplifier, an output coupled to an input of the feedback resistive element, and a second input coupled the output of the feedback resistive element, wherein the feedback control circuit is configured to provide a bias current to the MR sensor through the feedback resistive element. The methods generally include amplifying a signal from the MR sensor to produce an amplified signal, producing a feedback signal from the amplified signal, the feedback signal having a predetermined bias characteristic, and applying the feedback signal to the MR sensor. The systems generally include those that embody one or more of the inventive concepts disclosed herein. The present invention advantageously provides for low noise output from the preamplifier by locating all or most of the potentially noisy bias generating circuitry at the post-amplification side of the feedback loop.

38 Claims, 8 Drawing Sheets

CIRCUITS, SYSTEMS, AND METHODS FOR LOW NOISE BIASING OF MAGNETIC-RESISTANCE SENSORS

RELATED APPLICATIONS

This application claims the benefit of U.S. Provisional Application No. 60/822,688, filed Aug. 17, 2006, and incorporated herein by reference in its entirety.

FIELD OF THE INVENTION

The present invention generally relates to the field of magnetic storage systems. More specifically, embodiments of the present invention pertain to circuits, systems, and methods for low-noise generation of bias across magneto-resistive (MR) sensors.

DISCUSSION OF THE BACKGROUND

Magnetic storage systems, such as hard disk drives (HDDs), are used as mass storage in a wide variety of devices, including but not limited to personal computers, digital versatile disc (DVD) players, high definition television (HDTV) receivers, vehicle control systems, cellular or mobile telephones, television set top boxes, and portable media players. As these magnetic storage systems become smaller and/or attain higher data storage capacities, the density of data on the magnetic storage medium becomes higher.

A typical HDD includes magnetic storage media of one or more flat disks, called platters (sometimes also "disks" or "discs"). The platters are generally formed of two main substances: a substrate material that gives it structure and rigidity, and a magnetic media coating which holds the magnetic impulses (or moments) that represent data. A typical HDD further includes a read/write head, generally a magnetic transducer which can sense and/or change the magnetic fields stored on the platters. The read/write head is attached to a slider, generally an armature capable of placing the read/write head at a desired location over the platter.

The areal recording density of magnetic storage media, particularly of hard disk drives (HDDs), has increased greatly over time, and currently reaches several Gb/in$^2$ or more. Such improvement in areal density derives largely from innovation and improvement of various elemental technologies such as use of magneto-resistive storage systems, use of recording magnetic pole materials having high saturation magnetic flux densities, improvements in the manufacturing of magnetic sensor heads with a narrow track width, use of magnetic sensor heads having a narrower gap between the head the magnetic storage medium, miniaturization and high-precision processing of slider mechanisms, high-precision servo technology, and development of novel modulation/demodulation technologies. In addition, with respect to magnetic storage media, there have been advances in elemental technologies such as smoothing and flattening of the media surface (facilitating low flying height operation of the magnetic sensor head over the medium), reduction in magnetization transition width due to increases in coercivity and decreases in the thickness of magnetic layers, and medium noise reduction due to decreases in exchange interaction between magnetic grains and reductions in magnetic grain size.

As the density of data on the magnetic storage medium increases, the strength of the magnetic fields generally decrease, in order to minimize interference. Higher areal density in magnetic storage media generally requires advanced read/write transducer head design with compatible advanced preamplification circuit architectures. Advanced read head technologies such as giant magneto-resistive (GMR), tunneling magneto-resistive (TuMR), and current perpendicular to plane (CPP) with decreasingly small nano scale dimensions require very precise electronic biasing to function properly and reliably. Due to the very weak signals detected by these read head sensors, extreme attention has to be paid to noise produced by the preamplification system.

Figure 1A:
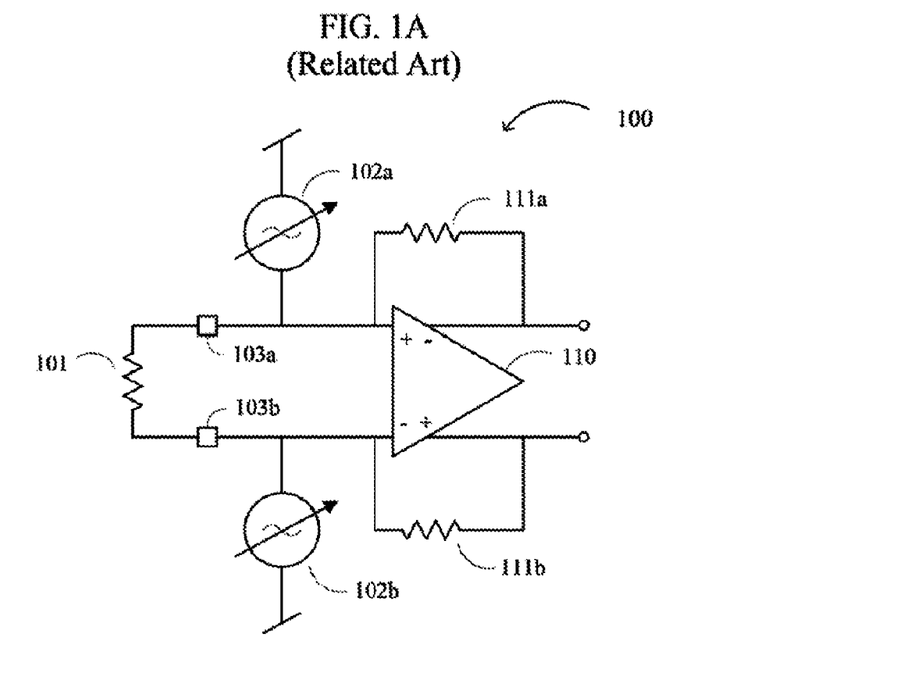
FIG. 1A is a diagram showing a conventional differential MR sensor preamplification circuits with feedback circuits and conventional current bias circuits.

Referring now to FIG. 1A, a conventional differential magnetic storage reading circuit 100 having current bias generators 102a and 102b is shown. MR sensor 101 is a magneto-resistive read/write transducer (e.g., positioned over a magnetic storage medium by a slider/armature apparatus, not shown). Variable current bias generators 102a and 102b provide bias current at both nodes 103a and 103b of MR sensor 101. MR sensor 101 may be coupled to amplifier 110, where changes in the resistance of the MR sensor (RMR) caused by changes in the magnetic field on the storage medium are amplified to read data from the storage medium. Similarly, FIG. 1B shows a conventional differential magnetic storage reading circuit 100 having voltage bias generators 105a and 105b.

Figure 2A:
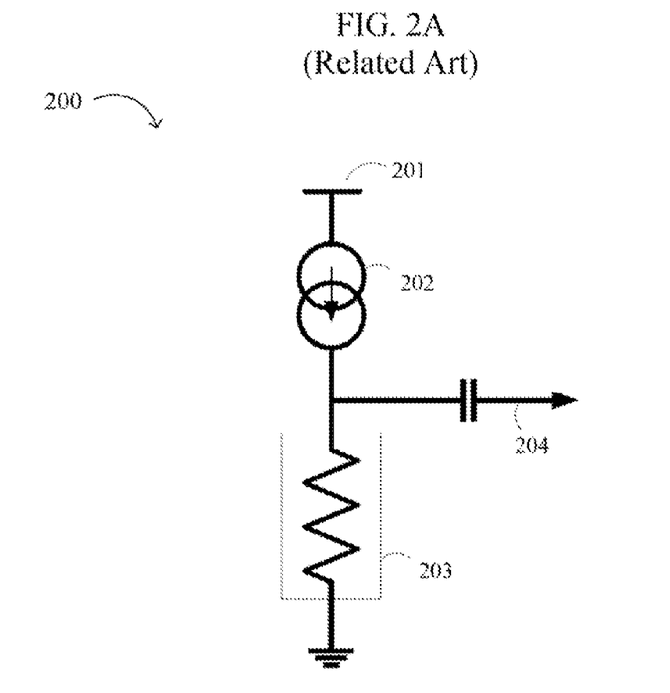
FIG. 2A is a diagram showing a conventional current bias circuit.

Two types of basic biasing schemes are currently used in conventional preamplifiers. Referring now to FIG. 2A, a conventional current bias block 200 is shown, which was also illustrated in FIG. 1A. Current bias block 200 may comprise current source 202, configured to provide a desired current to a node of MR sensor 203. In differential circuit applications, two current sources may be used to provide a bias current at each end of MR sensor 203. The current source 202 may comprise, for example, a current digital-to-analog convert (IDAC), such as a conventional 10-bit IDAC. The advantages of a current bias circuit include simple implementation and programming resolution that is independent of RMR.

Figure 1B:
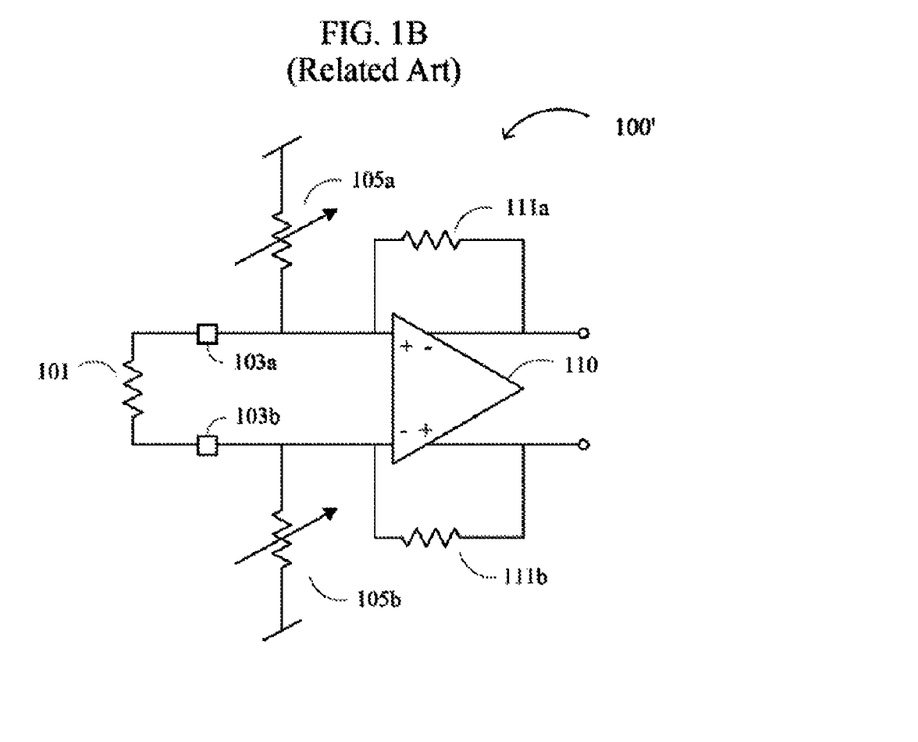
FIG. 1B is a diagram showing a conventional differential MR sensor preamplification circuits with feedback circuits and conventional voltage bias circuits.
Figure 2B:
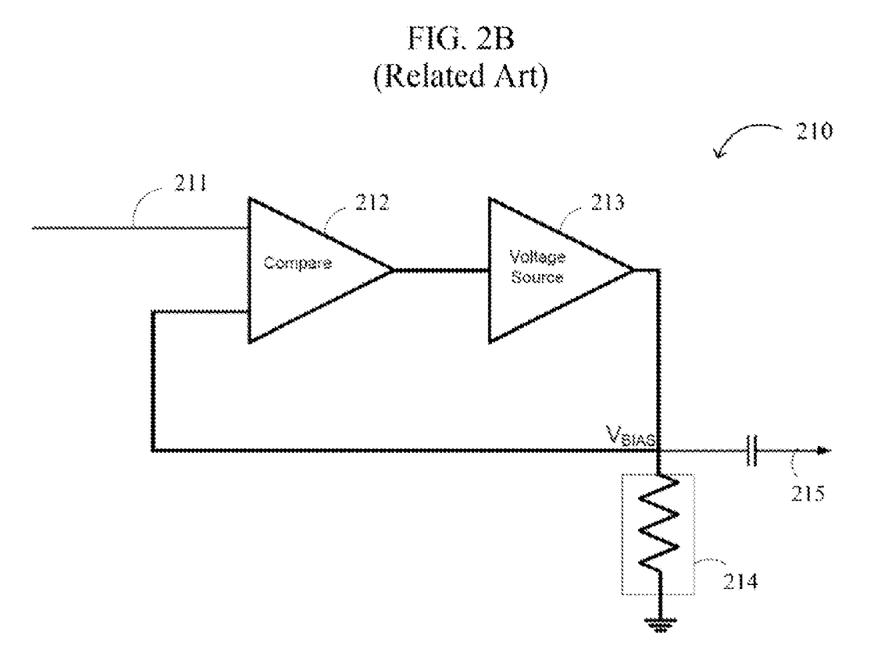
FIG. 2B is a diagram showing a conventional voltage bias circuit.

Referring now to FIG. 2B, a conventional voltage bias block 210 is shown, which was also illustrated in FIG. 1B. Voltage source 213 provides bias voltage $V_{BIAS}$ to MR sensor 214. Comparison circuit 212 compares $V_{BIAS}$ to a desired (programmed) voltage 211, and adjusts voltage source 213 accordingly to maintain the desired voltage. A conventional voltage bias block advantageously provides bias voltage and programmed resolution of the bias voltage that are independent of the resistance of the MR sensor (RMR). However, the voltage bias block generally produces larger bias noise than other biasing schemes, and requires a relatively complicated implementation.

Both conventional current bias block 200 and conventional voltage bias block 210 introduce noise to the signal from the MR sensor. This noise is then amplified by the preamplifier (e.g., preamplifier 110 of FIG. 1A). As the areal density of magnetic storage devices increases, and the strength of the magnetic field on such devices decreases, this additional noise from the bias generating circuit becomes more significant. Therefore, it would be advantageous to generate bias across the MR sensor with less noise.

SUMMARY OF THE INVENTION

Embodiments of the present invention relate to circuits, systems, and methods for generating bias for a magneto-resistive (MR) sensor in a magnetic storage device. The circuits generally relate to preamplifier circuits comprising an amplifier having an input coupled to a magneto-resistive (MR) sensor, a feedback resistive element (e.g., a resistor, leakage transistor, or other circuit element configured to provide resistance) having an output coupled to the MR sensor, and a feedback control circuit having a first input coupled to an output of the amplifier, an output coupled to an input of the feedback resistive element, and a second input coupled the output of the feedback resistive element, wherein the feedback control circuit is configured to provide a current bias or voltage bias to the MR sensor through the feedback resistive element.

Thus, the preamplifier may comprise means for amplifying a signal from a magneto-resistive (MR) sensor to produce an amplified signal, means for producing a feedback signal from said amplified signal, said feedback signal having a predetermined bias characteristic, and means for applying said feedback signal to said MR sensor.

In a preferred embodiment, the feedback control circuit further comprises a control input configured to receive a control signal, and wherein the feedback control circuit is further configured to provide the bias current in accordance with the control signal. The control signal may comprise a reference voltage, or alternatively the control signal may comprise a representation of a predetermined voltage and the feedback control circuit comprises a voltage generator configured to produce a reference voltage in accordance with the predetermined voltage (e.g., a digital value or signal representing a desired voltage). Similarly, the control signal may comprise a representation of a predetermined current (e.g., a digital value or signal representing a desired current). In a further embodiment, the feedback control circuit further comprises a comparator configured to compare a characteristic of a signal at the output of the feedback resistive element with a predetermined value.

In an exemplary embodiment, the feedback control circuit comprises a control input configured to receive a control signal, a comparator configured to compare a characteristic of a signal at the output of the feedback resistive element with a predetermined value, wherein the predetermined value is determined in accordance with the control signal, and a voltage generator configured to provide the bias current in accordance with an output of the comparator.

In another embodiment, the feedback control circuit further comprises a comparator configured to compare a voltage at the second input with the reference voltage. In a further embodiment, the current generator comprises a transistor having a gate coupled to an output of the comparator and a drain or source coupled to the output of the feedback control circuit. In a still further embodiment, the feedback control circuit further comprises an AC isolation capacitor having a first node coupled to the output of the amplifier and a second node coupled to the output of the comparator.

In yet another embodiment, the preamplifier circuit may also include a supplemental current source configured to provide an additional bias current (e.g., in addition to a current produced by the feedback control circuit) to the MR sensor. Alternatively, the preamplifier circuit may include a supplemental voltage source configured to provide an additional bias voltage (e.g., in addition to a voltage produced by the feedback control circuit) to the MR sensor.

The systems may include those that comprise the present circuit and/or any circuit embodying the inventive concepts described herein. For example, in one embodiment the invention relates to a magnetic storage system comprising a magnetic storage medium and the present preamplifier circuit, wherein the MR sensor is configured to sense changes in a magnetic field on the magnetic storage medium. Specifically the present invention relates to a hard disk drive comprising the preamplifier circuit presented herein, and to systems and devices that may incorporate such a hard disk drive.

The method for providing a bias current to a magneto-resistive (MR) sensor comprises amplifying a signal from the MR sensor to produce an amplified signal, producing a feedback signal from the amplified signal, the feedback signal having a predetermined bias characteristic, and applying the feedback signal to the MR sensor. In a further embodiment, producing the feedback signal includes applying the amplified signal or a derivative thereof to a feedback resistive element. In a preferred embodiment, producing the feedback signal includes determining the bias characteristic in accordance with a control signal.

The predetermined bias characteristic may comprises a predetermined bias voltage, a predetermined bias current, or a predetermined bias power. The control signal may comprise, for example, a reference voltage or a representation of the predetermined bias voltage (e.g., a digital value representing a desired bias voltage) and producing a feedback signal may include generating a reference voltage in accordance with the predetermined voltage. Alternatively, the control signal may comprise a representation of the predetermined bias current or predetermined bias power.

In another embodiment, producing the feedback signal includes comparing a characteristic of the signal from the MR sensor with the predetermined bias characteristic to produce a comparison signal. Thus, in one embodiment the comparing includes comparing a voltage at the MR sensor with a reference voltage. In another embodiment, the comparing includes comparing a current at the MR sensor with the predetermined bias current.

In yet another embodiment, producing the feedback signal comprises adjusting the feedback signal in response to the above comparison. In one exemplary embodiment, producing the feedback signal includes applying the comparison signal to a gate of a transistor and applying a signal from a source or drain of the transistor to a feedback resistive element. Producing the feedback signal may also include applying the amplified signal to a first node of an AC isolation capacitor and coupling a signal from a second node of the capacitor to the gate of the transistor.

In some embodiments, the method may also include applying an additional bias current from a supplemental current source to the MR sensor (e.g., if a sufficient bias current cannot be produced by the above method alone). Alternatively, the method may include applying an additional bias voltage from a supplemental voltage source to the MR sensor (e.g., if a sufficient bias voltage cannot be produced by the above method alone).

The present invention advantageously provides for low noise output from the preamplifier by locating all or most of the potentially noisy bias generating circuitry at the post-amplification side of the feedback loop. Thus, noise created by the bias generating circuitry is not further amplified and the output of a preamplifier according to the present invention will have less total noise than a conventional preamplifier.

These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, functional block, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

An Exemplary Circuit

Figure 3A:
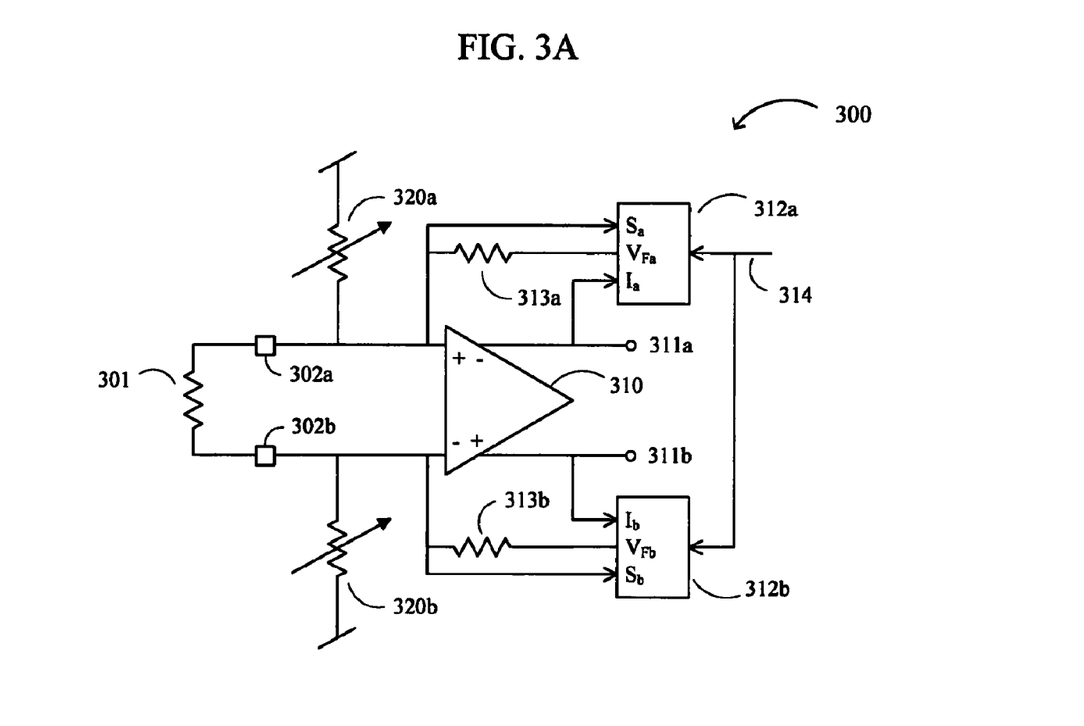
FIG. 3A is a diagram showing an embodiment of a circuit according to the present invention.

Referring now to FIG. 3A, an exemplary differential circuit 300 for generating bias across magneto-resistive (MR) sensor 301 is shown. Feedback resistors 313a and 313b have outputs coupled to the MR sensor 301. Feedback control circuits 312a and 312b have first inputs coupled to outputs of the amplifier 310, outputs $V_{Fa}$ and $V_{Fb}$ coupled to inputs of the feedback resistors 313a and 313b, and sensor inputs $S_a$ and $S_b$ coupled the outputs of the feedback resistor 312a and 312b. Feedback control circuits 312a and 312b are generally DC control circuits such that the gain of the amplifier (e.g., the ratio between the voltage difference at nodes 311a and 311b and the voltage difference at nodes 302a and 302b) is substantially the same as the gain of conventional amplifiers (e.g., amplifiers such as amplifier 100 of FIG. 1A and amplifier 100' of FIG. 1B that generate bias power conventionally using current and/or voltage bias generation circuits that are coupled directly to the MR sensor).

Feedback control circuits 312a and 312b may receive control input 314. Feedback control circuits 312a and 312b may be configured to provide the bias current in accordance with the control signal. The control signal may comprise a reference voltage, a representation of a desired voltage and the feedback control circuit comprises a voltage generator configured to produce a reference voltage in accordance with the desired voltage, a representation of a desired current, or other signal to control the bias current and/or voltage produced by feedback control circuits 312a and 312b.

Figure 3B:
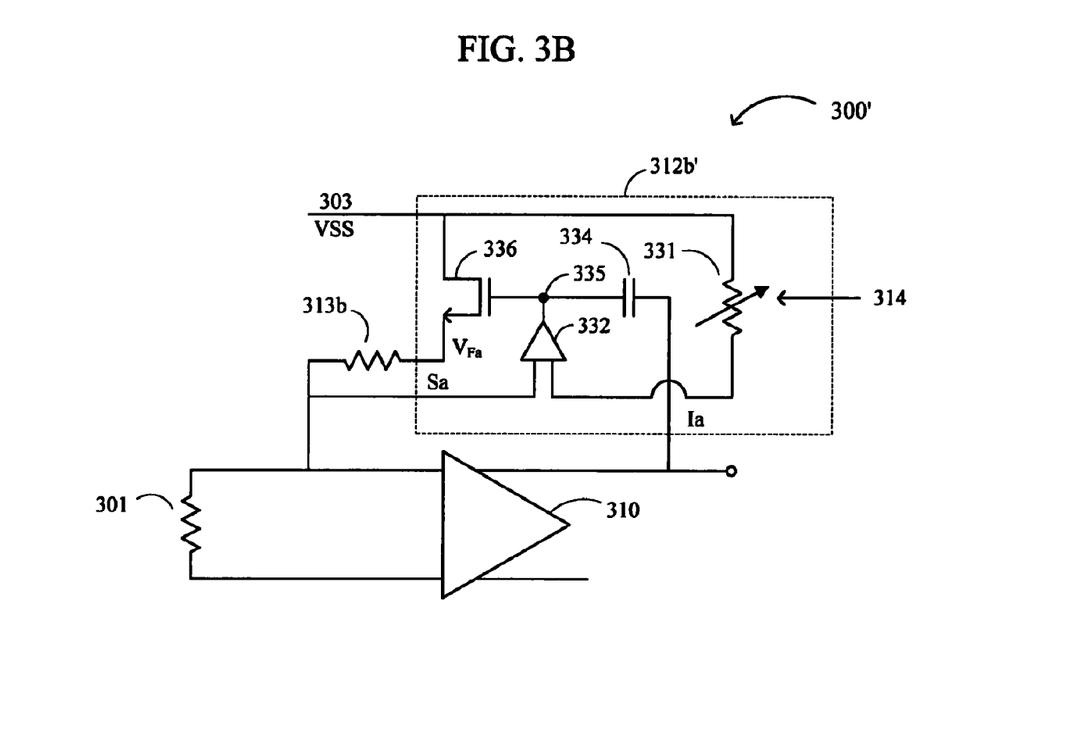
FIG. 3B is a diagram showing an embodiment of a self-biased feedback control circuit according to the present invention.

Referring now to FIG. 3B, self-biasing feedback control circuit 330 (corresponding to feedback control circuit 312a of FIG. 3A) is shown. In this embodiment, reference voltage generator 331 is configured to receive control signal 314 representing a desired voltage. Comparator 332 is configured to compare a voltage at input $S_a$ (e.g. at the output of feedback resistor 320a and coupled to one end of MR sensor 301) with the reference voltage from voltage generator 331, and to iteratively adjust an output current and/or voltage produced at node 335 until the voltage at input Sa matches the reference voltage. Alternatively, comparator 332 may receive a control input representing a desired bias current (e.g., a digital value representing the desired bias current), and may iteratively adjust the output current and/or voltage produced at node 334 until the current measured at input $S_a$ matches the desired current. The output of comparator 332 at node 335 is coupled to the gate of transistor 336 to control the current produced at output $V_{Fa}$. AC isolation capacitor 334 has a first node coupled to input 1a from an output of amplifier 310, and a second node coupled to node 335, thus completing the feedback loop of preamplifier circuit 330.

By locating all or most of the potentially noisy bias generating circuitry at the post-amplification side of the feedback loop (e.g., at the output side of amplifier 310), the noise introduced by bias generating circuitry in feedback control circuits 312a and 312b is not further amplified and the output of a preamplifier according to the present invention will have less total noise than a conventional preamplifier. However, in some cases feedback control circuits 312a and 312b may be unable to generate sufficient bias current and/or voltage to operate the MR sensor. Thus, referring again to FIG. 3A, in some implementations voltage bias generators 320a and 320b (or, alternatively, current bias generators such as current bias generator 202 of FIG. 2A) may be used to supplement the voltage or current produced by feedback control circuits 312a and 312b.

Exemplary Methods

Figure 3C:
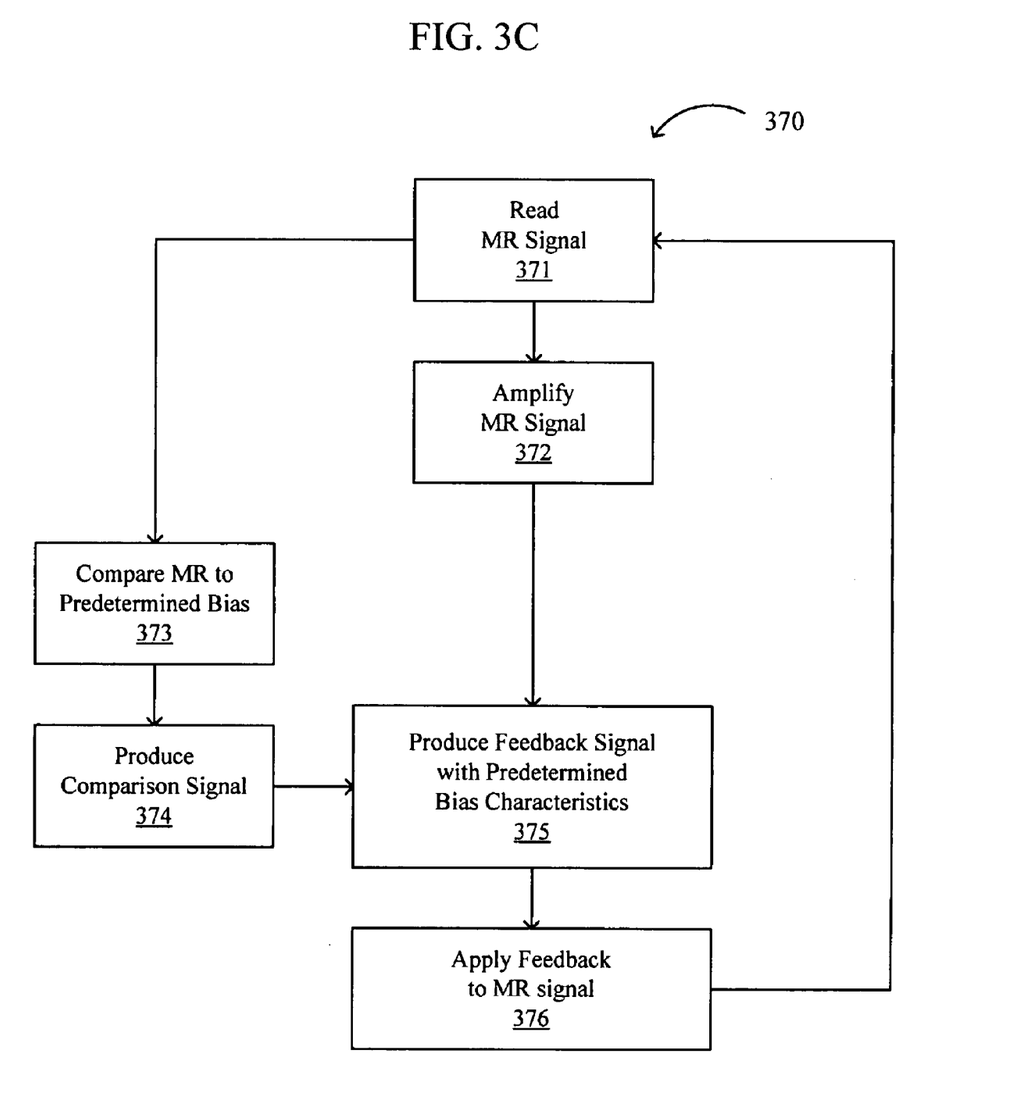
FIG. 3C is a flowchart showing a method for generating bias according the present invention.

Referring now to FIG. 3C, an exemplary method 370 for providing a bias current to a magneto-resistive (MR) sensor is shown. At step 371, a signal from the MR sensor (e.g., MR sensor 301 of FIG. 3A) is read. In order to read data from an MR sensor, a bias must be applied to the MR sensor. In this case, at least some of the bias is provided in the feedback signal which is applied at step 376, further described below. At step 372, the signal from the MR sensor is amplified (e.g., by an amplifier such as amplifier 310 of FIG. 3A).

At step 375, a feedback signal having a predetermined bias characteristic is produced. Step 375 may include determining the bias characteristic in accordance with a control signal. The predetermined bias characteristic may comprises a predetermined bias voltage, a predetermined bias current, or a predetermined bias power. The control signal may comprise, for example, a reference voltage or a representation of the predetermined bias voltage (e.g., a digital value representing the desired bias voltage) and producing a feedback signal may include generating a reference voltage in accordance with the desired voltage. Alternatively, the control signal may comprise a representation of the predetermined bias current or predetermined bias power.

In some embodiments, the method may include step 373 of comparing a characteristic of the signal from the MR sensor with the predetermined bias characteristic and step 374 of producing a comparison signal in response to the comparing step 373. In one exemplary embodiment the comparing step 373 may include comparing a voltage at the MR sensor with a reference voltage. In another embodiment, the comparing step 373 may include comparing a current at the MR sensor with the predetermined bias current.

Step 375 of producing the feedback signal may include adjusting the feedback signal in response to comparison step 373. Adjusting the feedback signal may include applying the comparison signal to a gate of a transistor (e.g., transistor 336 of FIG. 3B) and applying a signal from a source or drain of the transistor to a feedback resistor (e.g., feedback resistor 313b of FIG. 3B). Producing the feedback signal may also include applying the amplified signal to a first node of an AC isolation capacitor (e.g., AC isolation capacitor 334 of FIG. 3B) and coupling a signal from a second node of the capacitor to the gate of the transistor.

At step 376, the feedback signal is applied to the MR sensor, thus completing an amplifier feedback loop. In some embodiments, the method may also include applying an additional bias current from a supplemental current source to the MR sensor (e.g., if a sufficient bias current cannot be produced by the above method alone).

Exemplary Systems

Figure 4A:
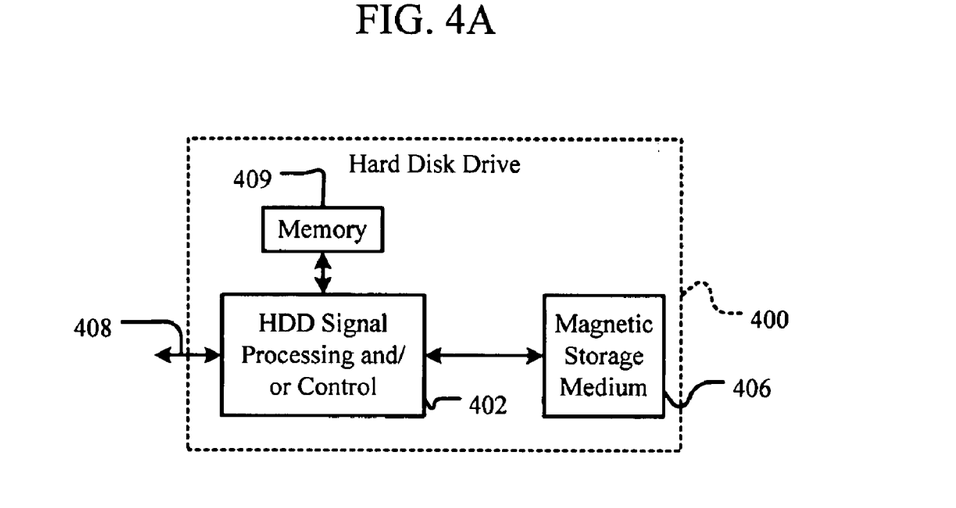
FIG. 4A is a diagram of an exemplary hard disk drive (HDD).

Various exemplary implementations of the present invention are shown in FIGS. 4A-4G. Referring now to FIG. 4A, the present invention can be implemented in a hard disk drive (HDD) 400. Specifically the present invention relates to a hard disk drive comprising the preamplifier circuit presented herein. The present invention may be implemented in a preamplifier circuit in signal processing and/or control unit 402, including an MR sensor configured to sense changes in a magnetic field on the magnetic storage medium 406. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), nonvolatile memory such as flash memory, read only memory (ROM), and/or other suitable electronic data storage.

Figure 4B:
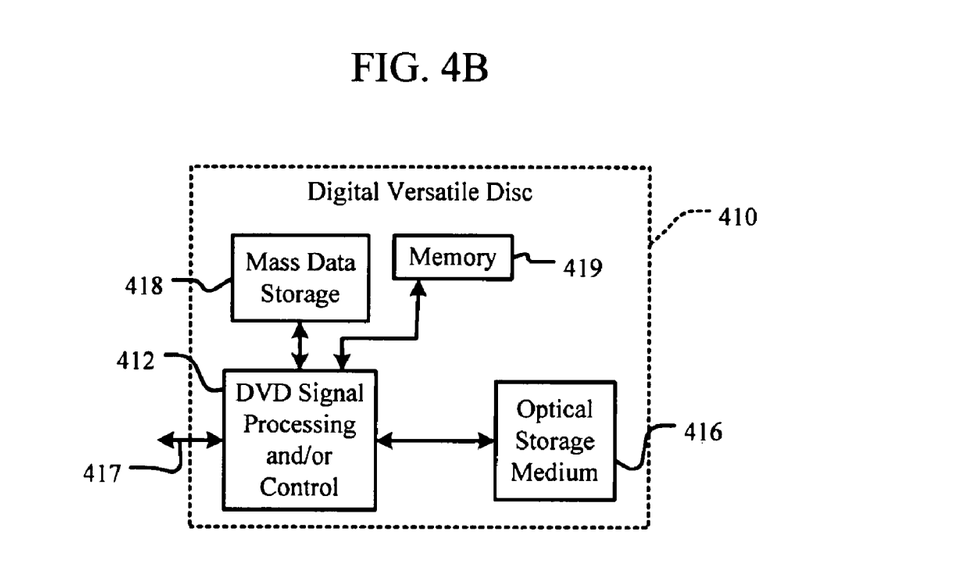
FIG. 4B is a diagram of an exemplary digital versatile disc (DVD) player.

Referring now to FIG. 4B, the present invention can be implemented in a digital versatile disc (DVD) drive 410. The present invention may be implemented in either or both signal processing and/or control circuits, which are generally identified in FIG. 4B at 412, and/or mass data storage of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 4A. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The DVD 410 may be connected to memory 419 such as RAM, ROM, nonvolatile memory such as flash memory and/or other suitable electronic data storage.

Figure 4C:
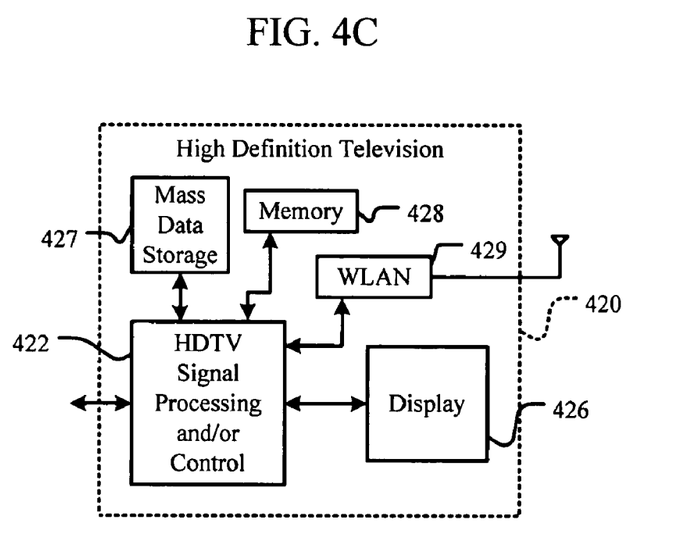
FIG. 4C is a diagram of an exemplary high definition television (HDTV).

Referring now to FIG. 4C, the present invention can be implemented in a high definition television (HDTV) 420. The present invention may be implemented in either or both signal processing and/or control circuits, which are generally identified in FIG. 4C at 422, a WLAN interface 429 and/or mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 4A and/or at least one DVD may have the configuration shown in FIG. 4B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The HDTV 420 may be connected to memory 428 such as RAM, ROM, nonvolatile memory such as flash memory and/or other suitable electronic data storage. The HDTV 420 also may support connections with a WLAN via a WLAN network interface 429.

Figure 4D:
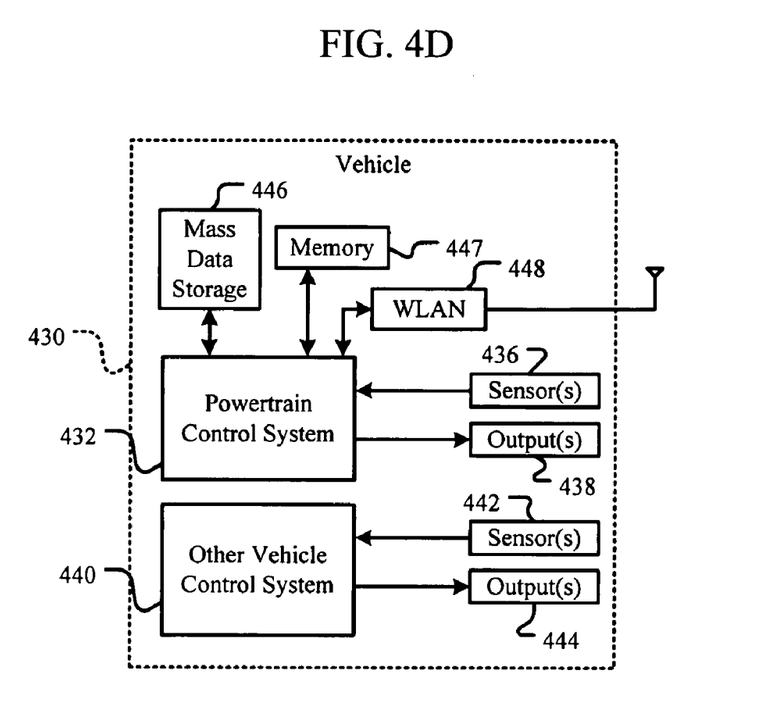
FIG. 4D is a diagram of an exemplary vehicle control system.

Referring now to FIG. 4D, the present invention may be implemented in a control system of a vehicle 430, a WLAN interface 448, and/or mass data storage 446 of the vehicle control system. In some implementations, the present invention may be implemented in powertrain control system 432 that receives inputs from one or more sensors such as temperature sensors, pressure sensors, rotational sensors, airflow sensors 436 and/or any other suitable sensors and/or that generates one or more output control signals 438 such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The powertrain control system 432 may be connected to memory 447 such as RAM, ROM, nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 4E:
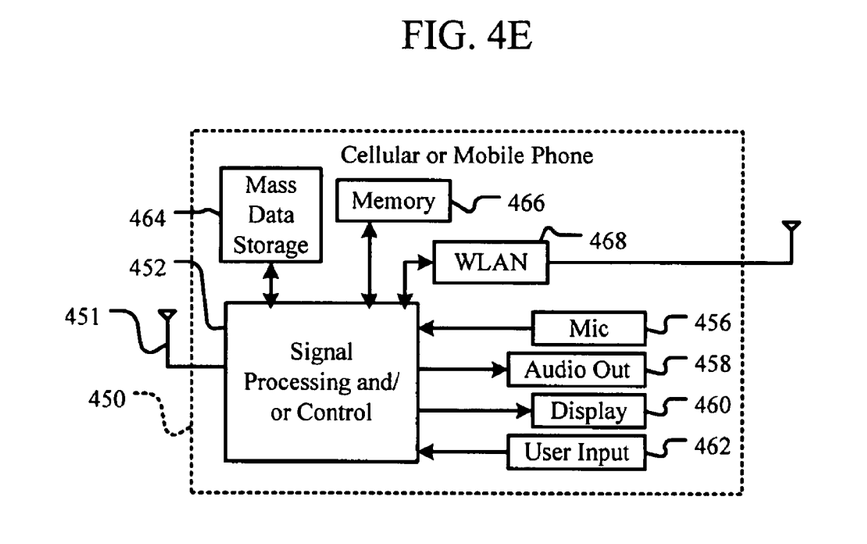
FIG. 4E is a diagram of an exemplary cellular or mobile phone.

Referring now to FIG. 4E, the present invention can be implemented in a cellular or mobile phone 450 that may include an antenna 451. The present invention may be implemented in either or both signal processing and/or control circuits, which are generally identified in FIG. 4E at 452, a WLAN interface 468 and/or mass data storage 464 of the cellular or mobile phone 450. In some implementations, the phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the phone 450 may process data, perform coding and/or encryption, perform calculations, format data and/or perform other phone functions.

The phone 450 may communicate with mass data storage 464 that stores data in a nonvolatile manner such as optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The phone 450 may be connected to memory 466 such as RAM, ROM, nonvolatile memory such as flash memory and/or other suitable electronic data storage. The cellular or mobile phone 450 also may support connections with a WLAN via a WLAN network interface 468.

Figure 4F:
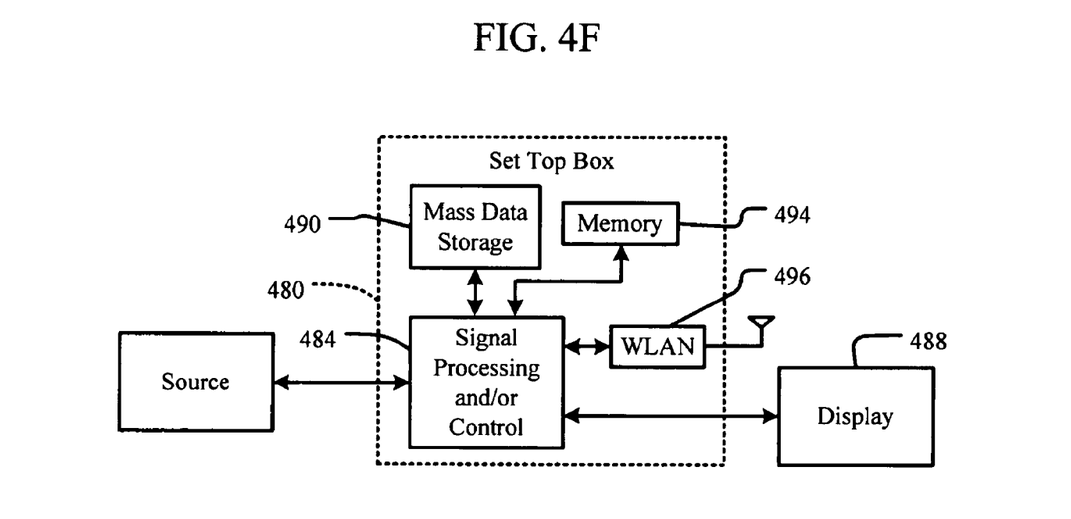
FIG. 4F is a diagram of an exemplary television set top box.

Referring now to FIG. 4F, the present invention can be implemented in a set top box 480. The present invention may be implemented in either or both signal processing and/or control circuits, which are generally identified in FIG. 4F at 484, a WLAN interface 496 and/or mass data storage 490 of the set top box 480. The set top box 480 receives signals from a source such as a broadband source 498 and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The set top box 480 may be connected to memory 494 such as RAM, ROM, nonvolatile memory such as flash memory and/or other suitable electronic data storage. The set top box 480 also may support connections with a WLAN via a WLAN network interface 496.

Figure 4G:
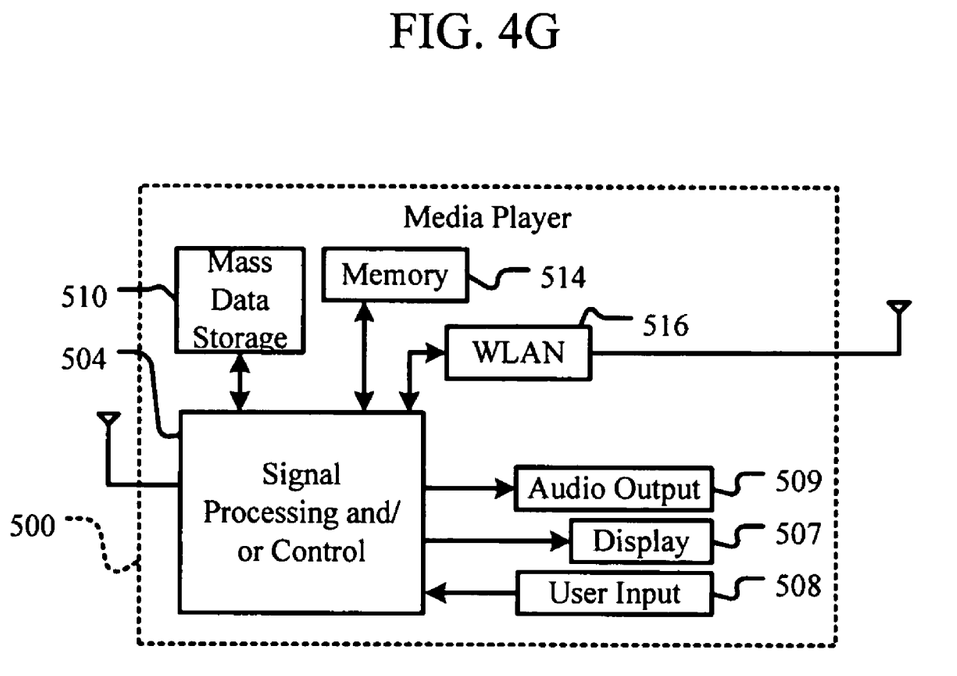
FIG. 4G is a diagram of an exemplary media player.

Referring now to FIG. 4G, the present invention can be implemented in a media player 500. The present invention may be implemented in either or both signal processing and/ or control circuits, which are generally identified in FIG. 4G at 504, WLAN interface 516 and/or mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The media player 500 may be connected to memory 514 such as RAM, ROM, nonvolatile memory such as flash memory and/or other suitable electronic data storage. The media player 500 also may support connections with a WLAN via a WLAN network interface 516. Still other implementations in addition to those described above are contemplated.

CONCLUSION/SUMMARY

Thus, the present invention provides a circuit, system, and method for generating bias for a magneto-resistive (MR) sensor in a magnetic storage device. The present invention advantageously provides for low noise output from the preamplifier by locating all or most of the potentially noisy bias generating circuitry at the post-amplification side of the feedback loop. Thus, noise created by the bias generating circuitry is not further amplified and the output of a preamplifier according to the present invention will have less total noise than a conventional preamplifier.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A preamplifier circuit in a magnetic storage system, said preamplifier circuit comprising:

an amplifier having an input coupled to a magneto-resistive (MR) sensor;
a feedback resistive element having an output coupled to said MR sensor; and
a feedback control circuit having (i) a first input coupled to an output of said amplifier, (ii) an output coupled to an input of said feedback resistive element, and (iii) a second input coupled said output of said feedback resistive element, wherein said feedback control circuit is configured to provide a bias to said MR sensor through said feedback resistive element.

2. The preamplifier circuit of claim 1, wherein said feedback control circuit further comprises a control input configured to receive a control signal, and wherein said feedback control circuit is further configured to provide said bias current in accordance with said control signal.

3. The preamplifier circuit of claim 2, wherein said control signal comprises a reference voltage.

4. The preamplifier circuit of claim 2, wherein said control signal comprises a representation of a predetermined voltage, and said feedback control circuit comprises a voltage generator configured to produce a reference voltage in accordance with said predetermined voltage.

5. The preamplifier circuit of claim 1, wherein said feedback control circuit further comprises a comparator configured to compare a characteristic of a signal at said output of said feedback resistive element with a predetermined value.

6. The preamplifier circuit of claim 1, wherein said feedback control circuit further comprises:

a control input configured to receive a control signal;
a comparator configured to compare a characteristic of a signal at said output of said feedback resistive element with a predetermined value, wherein said predetermined value is determined in accordance with said control signal; and
a current generator configured to provide said bias current in accordance with an output of said comparator.

7. The preamplifier circuit of claim 4, wherein said feedback control circuit further comprises a comparator configured to compare a voltage at said second input with said reference voltage.

8. The preamplifier circuit of claim 7, wherein said voltage generator comprises a transistor having (i) a gate coupled to an output of said comparator and (ii) a drain or source coupled to said output of said feedback control circuit.

9. The preamplifier circuit of claim 8, wherein said feedback control circuit further comprises an AC isolation capacitor having (i) a first node coupled to said output of said amplifier and (ii) a second node coupled to said output of said comparator.

10. The preamplifier circuit of claim 1, wherein said bias comprises a bias current.

11. The preamplifier circuit of claim 10, further comprising a supplemental current source configured to provide an additional bias current to said MR sensor.

12. The preamplifier circuit of claim 1, wherein said bias comprises a bias voltage.

13. The preamplifier circuit of claim 12, further comprising a supplemental voltage source configured to provide an additional bias voltage to said MR sensor.

14. A magnetic storage system comprising:

a magnetic storage medium;
a magneto-resistive (MR) sensor configured to sense changes in a magnetic field on said magnetic storage medium;
a preamplifier circuit comprising:
an amplifier having an input coupled to said MR sensor;

a feedback resistive element having an output coupled to said MR sensor; and a feedback control circuit having (i) a first input coupled to an output of said amplifier, (ii) an output coupled to an input of said feedback resistive element, and (iii) a second input coupled said output of said feedback resistive element, wherein said feedback control circuit is configured to provide a bias to said MR sensor through said feedback resistive element.

15. The magnetic storage system of claim 14 wherein a hard disk drive comprises said magnetic storage medium, said MR sensor, and said preamplifier circuit.

16. A digital versatile disc (DVD) recorder comprising the magnetic storage system of claim 14.

17. A television receiver comprising the magnetic storage system of claim 14.

18. A high definition television (HDTV) receiver comprising the magnetic storage system of claim 14.

19. A motor vehicle control system comprising the magnetic storage system of claim 14.

20. A cellular telephone comprising the magnetic storage system of claim 14.

21. A mobile telephone comprising the magnetic storage system of claim 14.

22. A set top box comprising the magnetic storage system of claim 14.

23. A media player comprising the magnetic storage system of claim 14.

24. A preamplifier in a magnetic storage system, said preamplifier comprising:

means for amplifying a signal from a magneto-resistive (MR) sensor to produce an amplified signal;

resistive means for applying a feedback signal to said MR sensor, said feedback signal having a predetermined bias characteristic; and means for (i) producing said feedback signal from said amplified signal and (ii) providing a bias to said MR sensor through said resistive means for applying said feedback signal.

25. A method for providing a bias current to a magneto-resistive (MR) sensor, said method comprising:

amplifying a signal from said MR sensor to produce an amplified signal;

determining a bias characteristic in accordance with a control signal;

producing a feedback signal from said amplified signal, said feedback signal having said bias characteristic; and applying said feedback signal to said MR sensor.

26. The method of claim 25, wherein producing said feedback signal includes applying said amplified signal or a derivative of said amplified signal to a feedback resistive element.

27. The method of claim 25, wherein said bias characteristic comprises a predetermined bias voltage.

28. The method of claim 25, wherein said control signal comprises a reference voltage.

29. The method of claim 27, wherein said control signal comprises a representation of said predetermined bias voltage, and said producing includes generating a reference voltage in accordance with said predetermined bias voltage.

30. The method of claim 25, wherein said bias characteristic comprises a predetermined bias current.

31. The method of claim 30, wherein said control signal comprises a representation of said predetermined bias current.

32. The method of claim 25, wherein said producing includes comparing a characteristic of said signal from said MR sensor with said bias characteristic to produce a comparison signal.

33. The method of claim 32, wherein said comparing includes comparing a voltage at said output with a reference voltage.

34. The method of claim 32, wherein said producing said feedback signal comprises adjusting said feedback signal in response to said comparing.

35. The method of claim 32, wherein said producing includes applying said comparison signal to a gate of a transistor and applying a signal from a source or drain of said transistor to said feedback resistive element coupled to said MR sensor.

36. The method of claim 35, wherein said producing includes applying said amplified signal to a first node of an AC isolation capacitor and coupling a signal from a second node of said capacitor to said gate of said transistor.

37. The method of claim 25, further comprising applying an additional bias current from a supplemental current source to said MR sensor.

38. The method of claim 25, further comprising applying an additional bias voltage from a supplemental voltage source to said MR sensor.

* * * * *